United States Patent
Kimoto et al.

(10) Patent No.: US 6,682,436 B2
(45) Date of Patent: Jan. 27, 2004

(54) SHOCK ABSORBING TUBE

(75) Inventors: Yukitane Kimoto, Ehime-ken (JP); Yasuyuki Kawanomoto, Ehime-ken (JP); Yutaka Ochi, Ehime-ken (JP); Minoru Nakamura, Osaka (JP)

(73) Assignee: Toray Industries Inc., Tokyo (JP)

( * ) Notice: Subject to any disclaimer, the term of this patent is extended or adjusted under 35 U.S.C. 154(b) by 14 days.

(21) Appl. No.: 09/903,633

(22) Filed: Jul. 13, 2001

(65) Prior Publication Data

US 2001/0051544 A1 Dec. 13, 2001

Related U.S. Application Data (63) Continuation-in-part of application No. 09/764,319, filed on Jan. 19, 2001, now abandoned, which is a continuation of application No. 09/426,718, filed on Oct. 26, 1999, now Pat. No. 6,190,263, which is a continuation of application No. 08/967,368, filed on Nov. 7, 1997, now abandoned, which is a continuation of application No. 08/495,543, filed as application No. PCT/JP94/01996 on Nov. 29, 1994, now abandoned.

(30) Foreign Application Priority Data

Nov. 30, 1993 (JP) ................................. 6-300312
Nov. 30, 1993 (JP) ................................. 6-300313

(51) Int. Cl.$^7$ ................................. F16C 3/02
(52) U.S. Cl. ....................... 464/181; 464/183
(58) Field of Search ................. 464/181, 182, 464/183; 403/265; 138/371; 280/777

(56) References Cited

U.S. PATENT DOCUMENTS

| | | | | |
|---|---|---|---|---|
| 4,605,385 A | * | 8/1986 | Puck et al. | 464/181 |
| 4,664,644 A | * | 5/1987 | Kumata et al. | 464/180 |
| 4,932,924 A | * | 6/1990 | Lobel | 464/181 |
| 5,683,300 A | * | 11/1997 | Yasui et al. | 464/181 |
| 5,836,825 A | * | 11/1998 | Yamane | 464/181 |
| 6,190,263 B1 | * | 2/2001 | Kimoto et al. | 464/181 |
| 6,350,204 B1 | * | 2/2002 | Yasui et al. | 464/181 |

* cited by examiner

Primary Examiner—Gregory J. Binda
(74) Attorney, Agent, or Firm—Morrison & Foerster LLP (57) ABSTRACT

A shock absorbing tube comprising a cylindrical main body made of fiber-reinforced plastic and an end member formed internally at an end of the main body, the main body and the end member are capable of separating from each other at an interface therebetween upon the application of a predetermined maximum axial force (Fm) and is capable of moving axially by sequentially enlarging the main body at a predetermined successive axial force (Fs), wherein the main body comprises reinforcing fibers helically wound at an angle of ±5–30° with respect to the axial direction of the main body and the end member is made of a metal or comprises reinforcing fibers hoop wound at an angle of ±70–90° with respect to the axial direction of the end member. The shock absorbing tube is useful for human safety, in particular, for use of propeller shaft and collapsible handle of automobiles.

19 Claims, 9 Drawing Sheets

SHOCK ABSORBING TUBE

RELATED APPLICATIONS AND PATENTS

This application is a continuation-in-part of application Ser. No. 09/764,319, filed Jan. 19, 2001, now abandoned which is a continuation of application Ser. No. 09/426,718, filed Oct. 26, 1999, now U.S. Pat. No. 6,190,263, issued Feb. 20, 2001, which is a continuation of application Ser. No. 08/967,368, filed Nov. 7, 1997, now abandoned, which is a continuation of application Ser. No. 08/495,543, filed Jul. 28, 1995, now abandoned, which is a 371 national stage application of PCT/JP94/01996, filed Nov. 29, 1994.

TECHNICAL FIELD

This invention relates to a shock absorbing tube such as for drive shaft of automobiles and the like.

TECHNICAL BACKGROUND

Nowadays, there is a great demand for safety design and weight reduction in automobiles from the viewpoint of passenger's safety and fuel economy improvement, etc. As a means for achieving this, use of shock absorbing tube such as for propeller shaft and collapsible parts of steering system formed of FRP (fiber-reinforced plastics) are being considered, and some of them have already been put into practical use. Such an FRP shock absorbing tube has a cylindrical main body that is made of FRP, and metal joints that are joined to the ends of this main body.

An automobile propeller shaft, which serves to transmit torque generated in the engine to driving wheels, is required to have a torsional strength of approximately 100–400 kgf.m. Further, it is also required to have a high critical revolution of approximately 5,000 to 15,000 rpm in order that resonance may be avoided at high-speed driving. On the other hand, an automobile collapsible part of steering system is required only compressive strength. To satisfy these fundamental requirements, various parameters, such as the kind, quantity and orientation of reinforcing fibers, the layered structure, the outer and inner diameters, and the wall thickness, are taken into consideration when designing the main body, which is made of FRP.

For example, in determining the fiber orientation of the reinforcing fibers, the following facts are to be taken into account: mainly from the viewpoint of torsional strength, the reinforcing fibers are most effectively arranged at an angle of ±45° with respect to the axial direction of the main body. Mainly from the viewpoint of torsional buckling strength, the fiber angle of ±80°~90° is also needed with respect to the axial direction of the main body. Mainly from the viewpoint of critical revolution, the reinforcing fibers are to be arranged in a direction as close as possible to the axial direction in order to achieve an increase in bending modulus to thereby obtain a high bending resonance frequency.

Thus, the most effective orientation for the reinforcing depends upon the fundamental requirement to be taken into consideration, such as torsional strength or critical revolution, which means the layer structure has to be determined by appropriately combining orientations that are most suitable from the viewpoint of the actual requirements. The torsional strength can also be dealt with in terms of dimensions, such as outer diameter and wall thickness, so that, when designing a shock absorbing tube, first priority is usually given to the critical revolution, which greatly depends upon the orientation of the reinforcing fibers, and the proportion of those layers in which the reinforcing fibers are arranged at a low angle with respect to the axis of the shaft is made relatively large. This, however, entails the following problems:

The assurance of safety for the passengers when a collision occurs is an issue no less important than weight reduction. The prevailing present-day idea in automobile design regarding safety assurance consists in a crushable body structure, in which the impact energy (compressive load) at the time of collision is absorbed by the compressive destruction of the body, thereby mitigating the rapid acceleration applied to the passengers. It should be noted, however, that, if the body of the FRP shock absorbing tube is designed in conformity with the above idea, which gives priority to critical revolution, the strength of the body with respect to an axial compressive load must inevitably increase. This leads to deterioration in the impact energy absorbing effect. Thus, when the body suffers rupture as a result of a collision and the rupture proceeds to reach the shock absorbing tube, the shock absorbing tube will act as a kind of prop.

As a means for solving this problem, Japanese Patent Laid-Open No. 3-37416 proposes a shock absorbing tube in which the joints are allowed to move axially along the joint surfaces between the main body and these joints, and, in this process, the joints force the main body to gradually enlarge until its rupture, starting from the ends thereof, thereby breaking the shock absorbing tube. However, in this conventional shock absorbing tube, it is necessary for the main body and the joints to be joined together through the intermediation of teeth of a complicated shape, a separating agent, etc., in order to secure the movement of the joints, resulting in a rather complicated structure. Furthermore, a complicated production process is not avoided. Moreover, when, in a shock absorbing tube having such a construction, joints are to be joined by press fitting, the main body must be strong enough to withstand the force applied in the press fitting process. However, imparting such a high strength to the main body makes it difficult for the main body to be enlarged and broken by the compressive load. Thus, it is quite difficult simultaneously to satisfy the above-mentioned fundamental requirements and the requirements regarding enlargement and rupture, which are contradictory to each other.

Japanese Patent Laid-Open No. 4-339022 discloses a shock absorbing tube in which, when an axial compressive load is applied, the joints are caused to move along the joint surfaces between the main body and these joints toward the interior of the main body, whereby the impact energy is absorbed by the movement resistance. However, in such a construction, it is absolutely necessary for the outer diameter of the joints to be smaller than the inner diameter of the main body, resulting in a reduction in the degree of freedom in designing. Furthermore, the amount of movement is limited to the length of the joints, so that the effect of absorbing the impact energy is not so great.

Thus, the conventional shock absorbing tubes can not be regarded as well balanced in terms of fundamental requirements regarding torsional strength, critical revolution, etc. and safety assurance for the passengers at the time of a collision.

It is an object of this invention to provide a shock absorbing tube in which the above problems in the conventional shock absorbing tubes have been solved and which, when the automobile undergoes a crash, reliably causes rupture to proceed in the shock absorbing tube with the breakage of the car body, thereby making it possible for the energy absorbing effect of the car body to be fully exerted.

SUMMARY OF THE INVENTION

To achieve the above object, there is provided, a shock absorbing tube comprising a cylindrical main body made of fiber-reinforced plastic and an end member formed internally at an end of said main body, said main body and said end member are capable of separating from each other at an interface therebetween upon the application of a predetermined maximum axial force (Fm) and is capable of moving axially by sequentially enlarging said main body at a predetermined successive axial force (Fs), wherein said main body comprises reinforcing fibers helically wound at an angle of ±5–30° with respect to the axial direction of said main body and the end member is made of a metal or comprises reinforcing fibers hoop wound at an angle of ±70–90° with respect to the axial direction of said end member.

Preferably, said shock absorbing tube satisfies the following relation.

$$0.15Fm \leq Fs \leq 0.60Fm$$

When an axial compressive load is applied to the end member to be separated from each other to cause rupture of the main body to proceed, thereby enabling the energy absorbing effect due to a crushable body structure to be realized.

Additional advantages of this invention would become readily apparent to those skilled in this art from the following detailed description, wherein only the preferred embodiments of this invention are shown and described, simply by way of illustration of the best mode contemplated for carrying out this invention. As would be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION OF THE INVENTION

Figure 1:
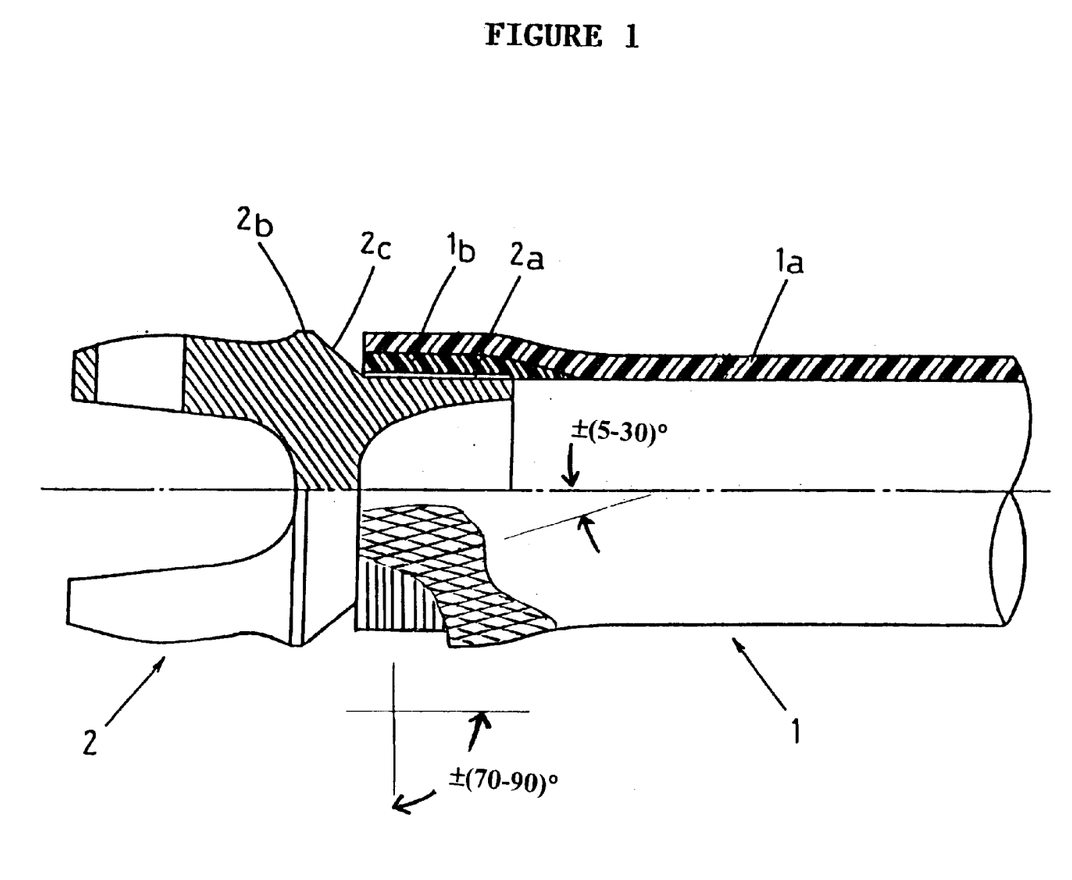
FIG. 1 is a schematic front view, partly in longitudinal section, showing the essential part of a shock absorbing tube according to an embodiment of the present invention.
Figure 2:
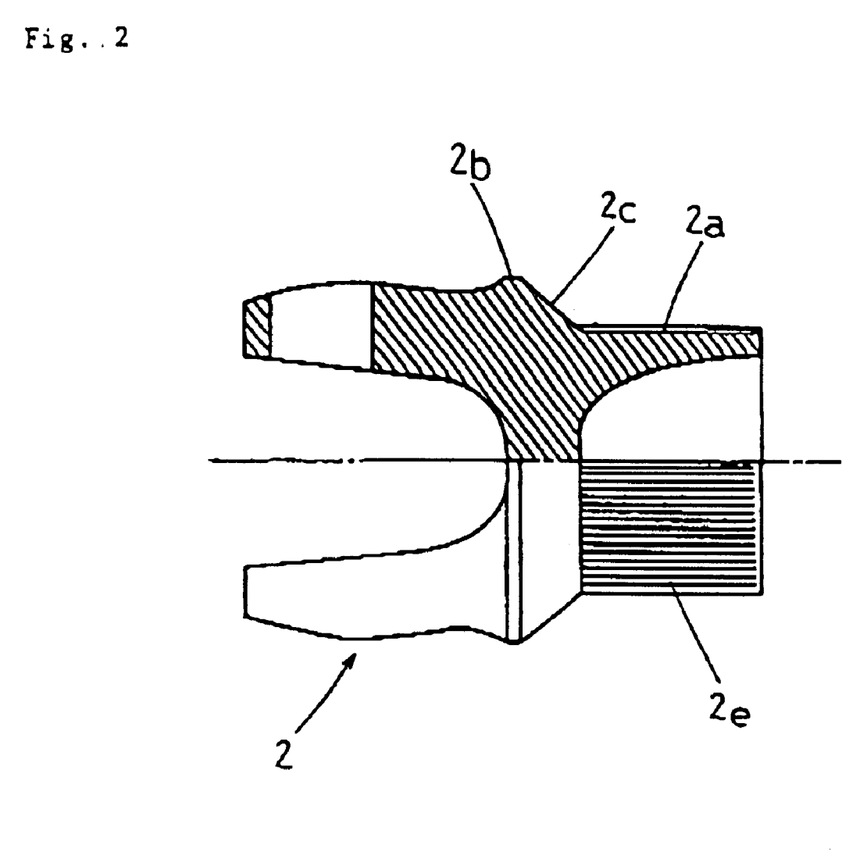
FIG. 2 is a schematic front view, partly in longitudinal section, showing a joint used in the shock absorbing tube shown in FIG. 1.

This invention will now be described in more detail with reference to an embodiment thereof. FIGS. 1 and 2 show a shock absorbing tube having a cylindrical main body 1 formed of FRP, which is obtained by reinforcing a thermosetting resin, such as epoxy resin, unsaturated polyester resin, phenol resin, vinyl ester resin or polyimide resin, or a thermoplastic resin, such as polyamide resin, polycarbonate resin, or polyether imide resin, by means of reinforcing fibers of high strength and high modulus, such as carbon fibers, glass fibers, or aramid fibers. Metal joints 2 are joined to one and/or the other end of the main body 1 by, preferably, press fitting. This shock absorbing tube is, preferably, symmetrical about the midpoint thereof with respect to the longitudinal direction.

The main body 1 has a main layer 1a having a uniform inner diameter, extending over the entire length thereof, and including reinforcing fibers helically wound at an angle of ±5°–30°, preferably at an angle of ±10°–20°, with respect to the axial direction, and end members (preferably, layers made of fiber reinforced plastic in which reinforcing fibers are arranged at an angle of ±70–90°, preferably at an angle of ±80–90°, with respect to the axial direction) 1b formed at the ends of the main body 1 so as to be integral with and internally of the main layer 1a and including hooped reinforcing fibers. The main layer 1a is wound mainly to satisfy the bending modulus in the axial direction of the main body 1 to thereby enhance the flexural resonance frequency, and torsional strength of the shock absorbing tube. The end members 1b mainly serve to impart to the end of the main body 1, to which the joint are joined, for example, by press fitting, a strength large enough to withstand the force applied at the time of joining the joint without preventing the progress of rupture as described below, and transmit the torque (torsional torque) from the joints 2 to the main body 1. The main body 1 can be formed, for example, by the filament winding method.

That is, a bundle of reinforcing fibers impregnated with resin is hooped around one end of a mandrel to form an end member to a desired thickness and in a desired length, and then the bundle of reinforcing fibers impregnated with resin is passed as it is to the other end of the mandrel to form an end member at the other end in a similar manner. The end member can be made of a metal, such as of aluminum or steel, in a predetermined shape, and put at one or both ends of the mandrel. Subsequently, a bundle of fibers impregnated with resin is helically wound while reciprocating the bundle of layers impregnated with resin between one and the other end to thereby form a main layer having a desired thickness. When the formation of the main layer has been completed, it is possible to hoop one layer of a bundle of fibers impregnated with resin around the main layer, whereby surplus resin is squeezed out to increase the volume content of the reinforcing fibers, thereby further improving various kinds of strengths, modulus, etc. of the main body. In this way, it is possible to form the layers continuously without cutting the bundle of reinforcing fibers in mid course. After the formation of the layers, the resin is cured or solidified, preferably rotating them the while. Then, the mandrel is drawn out to thereby obtain the main body.

Each joint 2 is in contact with the inner side of the end member 1b, and has a joint surface 2a that is somewhat shorter than the associated end member 1b. The outer diameter of that section of the joint where the joint surface 2a is formed is slightly larger than the inner diameter of the main body 1 before press fitting. Thus, when the joint 2 is forced into the main body 1, a compressive stress is applied to the joint surface 2a of the joint, and a circumferential tensile stress is applied to the main body. Due to the compressive stress between the main body 1 and the joint the main body 1 and the joint 2 are firmly joined together. At each end of the main body 1, the end member 1b exists internally, and the main layer 1a on the outer side, so that the circumferential tensile strength generated in the main body 1 as a result of the press fitting is mainly borne by the end member 1b. The distortion of the main body 1 is largest on the inner periphery and diminishes toward the outer periphery. However, due to the hooped reinforcing fibers, the end member, which is situated internally of the main layer 1a has a relatively large circumferential tensile strain, while the main layer 1a has a relatively small circumferential tensile strain, with the result that an effective joint condition is realized.

The larger the difference between the outer diameter of that section of the joint 2 where the joint surface 2a is formed and the inner diameter of the main body 1 before junction, i.e., the press fitting margin, the larger the joining force to be obtained, and the more improved the torsional strength. Thus, the larger this difference, the more convenient it is from the viewpoint of the transmission of torque. The joining force, however, also varies with the area, surface condition, etc. of the joint surface 2a. Usually, the ratio of the press fitting margin to the inner diameter of the main body 1 is determined within the range of 0.001~0.02, and the length of the joint surface 2a as measured along the axial direction of the main body 1 is set to be not smaller than $\frac{1}{10}$ of the inner diameter of the main body 1. Further, as shown in FIG. 2, it would be very convenient to provide a serration 2e extending along the axial direction of the joint. Apart from this, it would also be expedient to enhance the joining force, facilitate the press fitting through improvement of slip, fill the gap between the joint surface 2a and the inner surface of the end member 1b, or apply adhesive to the joint surface 2a for the purpose of protecting the joint surface 2a from the atmospheric air.

The above-mentioned joint 2 includes a ring-like protrusion 2b whose outer diameter is somewhat larger than the inner diameter of the main body 1, and a slope 2c descending from this protrusion 2b toward the joint surface 2a. The protrusion 2b and the slope 2c constitute a compressive load transmitting section which concentrates a compressive load acting in the axial direction of the joint 2 on the interface between the main layer 1a and the end member 1b to thereby separate the main layer 1a and the end member 1b from each other. It is desirable for the angle which the slope 2c makes with the main body 1 to be in the range of 15~45°.

Figure 3:
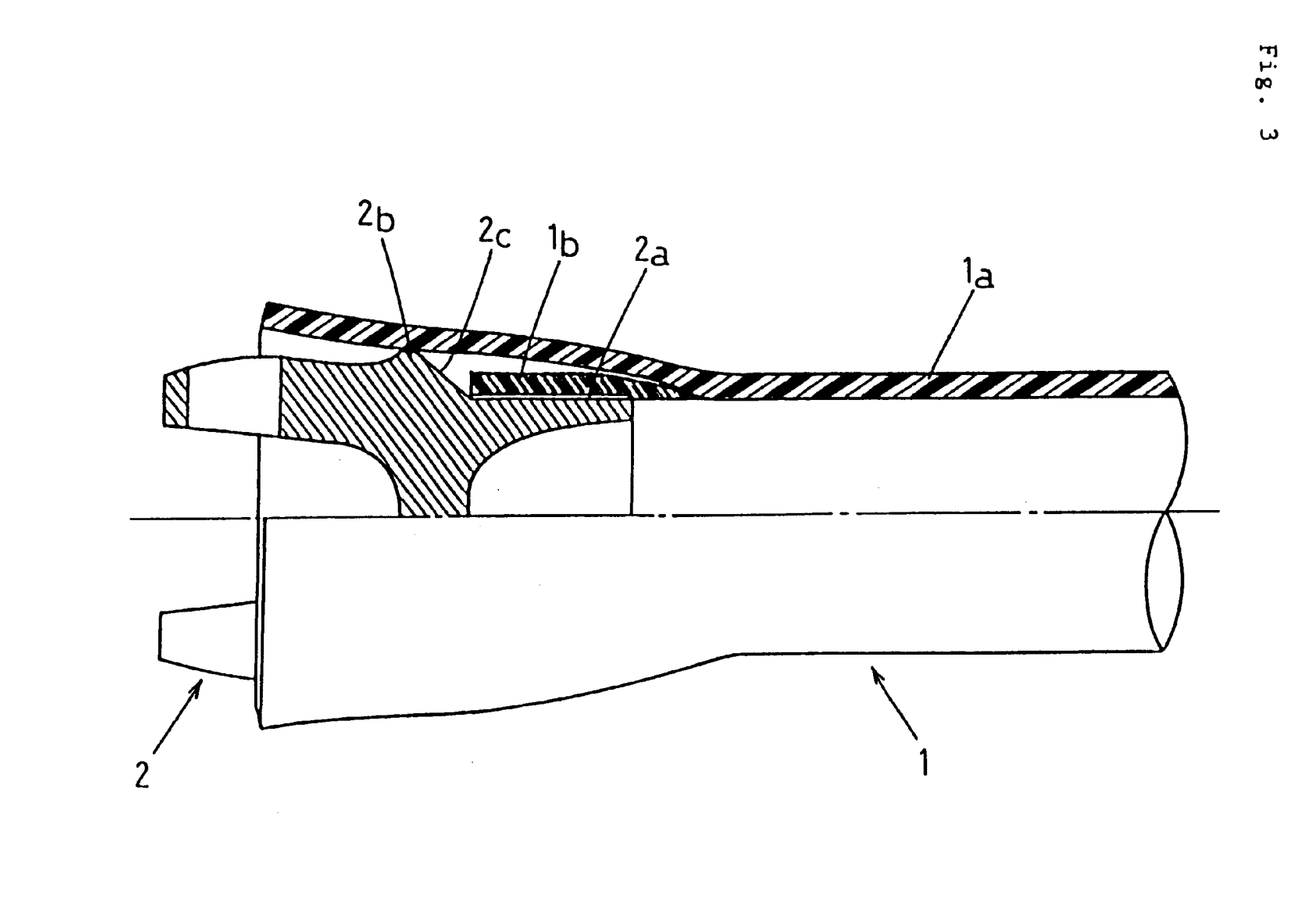
FIG. 3 is a schematic front view, partly in longitudinal section, of the essential part of the shock absorbing tube shown in FIG. 1, showing how rupture proceeds in the shock absorbing tube.

When an axial compressive load is applied to the shock absorbing tube described above, the joint 2 is pressed against the main body 1 to thereby forcibly enlarge the main body 1 under the action of the slope 2c of the protrusion 2b, thereby generating a circumferential tensile deformation. Then, while the end member 1b, which is situated internally, remains unbroken due to its high circumferential tensile strain, the main layer 1a, which is situated externally, suffers rupture due to its relatively low circumferential tensile strain. This rupture causes inter-layer exfoliation between the main layer 1a and the end member 1b. That is, the main layer 1a and the end member 1b are separated from each other. From this stage onward, the rupture proceeds rapidly. However, the end member 1b, which is joined to the joint 2, does not suffer rupture but moves axially through the main body 1 while destroying the main layer 1a with the joint 2 as it moves along.

In this way, the axial energy is absorbed through the rupture of the main layer 1a. The initial failure of the main body 1 is induced by the slope 2c of the joint 2, and the protrusion 2b forcibly enlarges the main layer 1a. In view of this, it is desirable for the angle which the slope 2c makes with respect to the axial direction on of the main body 1 to be in the range of 15°~45°, as stated above.

Figure 4:
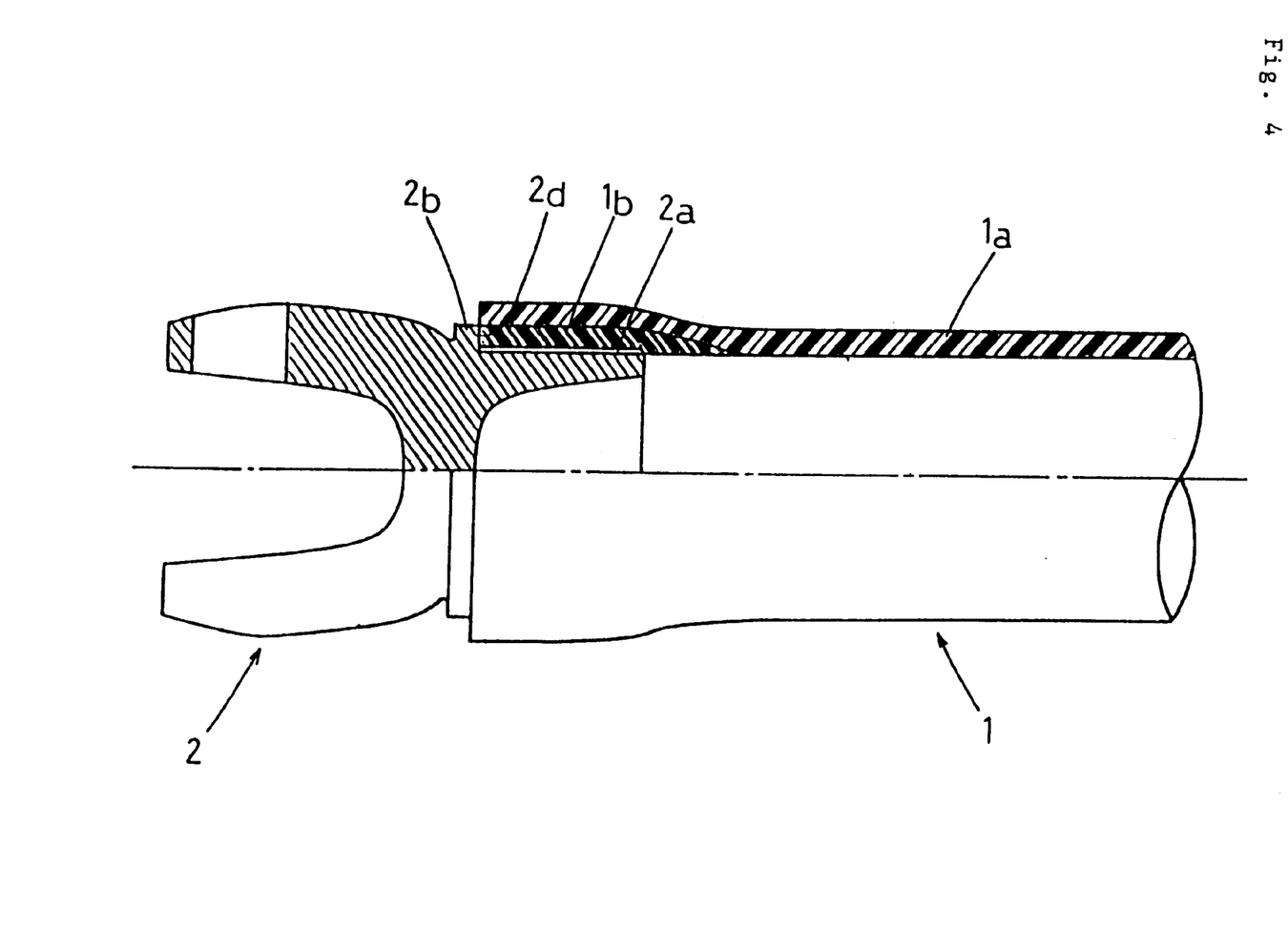
FIG. 4 is a schematic front view, partly in longitudinal section, showing the essential part of a shock absorbing tube according to another embodiment of the present invention.
Figure 5:
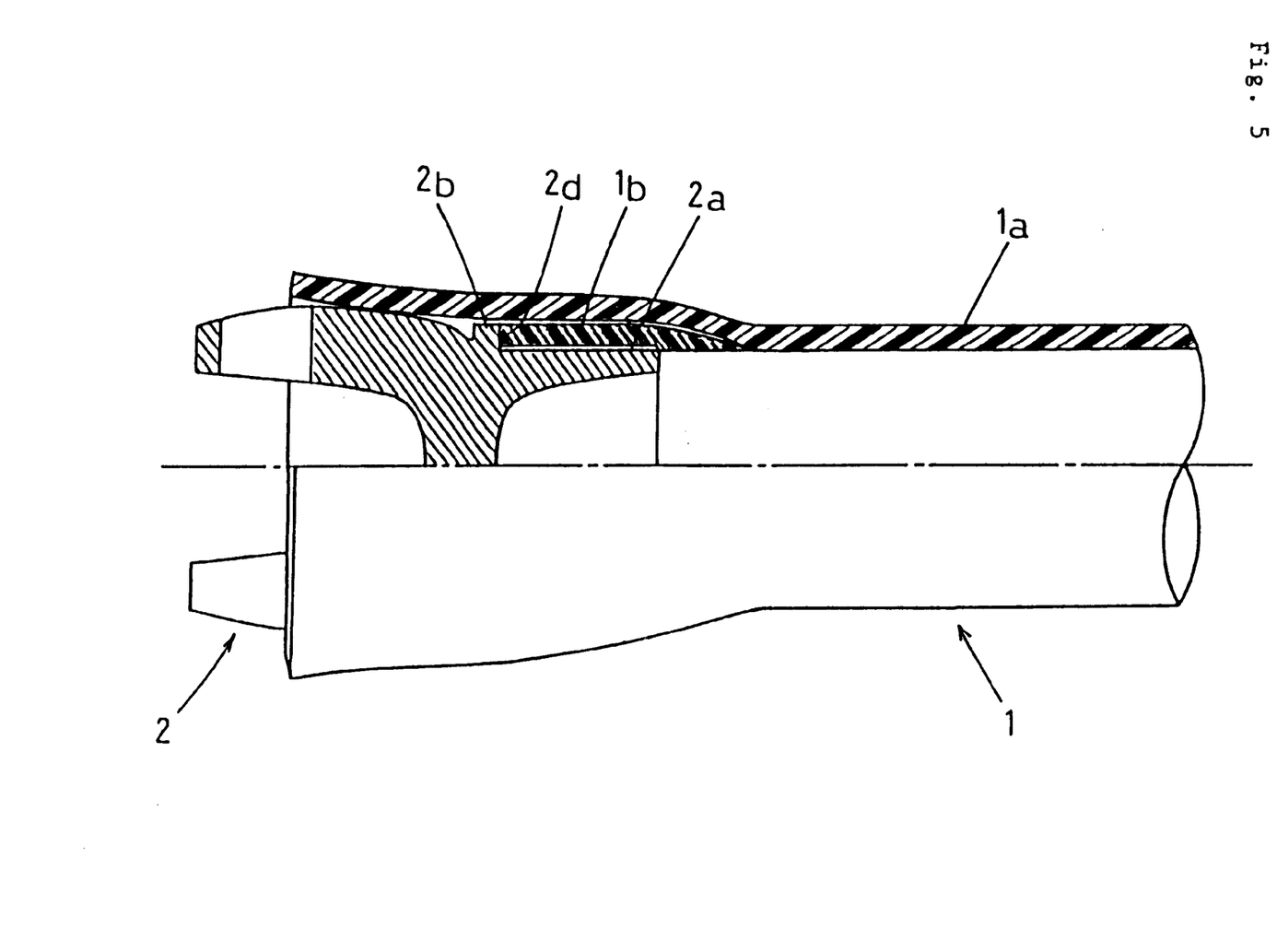
FIG. 5 is a schematic front view, partly in longitudinal section, of the essential part of the shock absorbing tube shown in FIG. 4, showing how rupture proceeds in the shock absorbing tube.

FIG. 4 shows a shock absorbing tube according to another embodiment of this invention. In this embodiment, what corresponds to the slope 2c of the ring-like protrusion 2b, shown in FIG. 1, provides an erect surface 2d that is opposed to the outer axial end surface of the end member 1b. The outer diameter of the protrusion 2b is slightly smaller than that of the end member 1b. In this shock absorbing tube, in which the protrusion 2b and the erect surface 2d constitute the compressive load transmitting section, a compressive load acting in the axial direction is transmitted to the end member 1b from the erect surface 2d, which is opposed thereto, and further transmitted to the main layer 1a. Therefore, although the main layer 1a undergoes compressive deformation, a shearing stress which would destroy the interface between the two layers acts on this interface due to the large difference in Poisson's ratio between the main layer 1a and the end member 1b. This stress, with the shearing stress generated between the layers by the compressive load, generates the interface failures, and, from this stage onward, the rupture of the main layer 1a proceeds as shown in FIG. 5. However, this embodiment differs from the above-described one in that it is the end member 1b that moves while forcibly enlarging the main layer 1a, and the protrusion 2b does not contribute to this forcible enlargement. The same effect is to be achieved by making the outer diameter of the protrusion 2b smaller than that of the end member 1b. The erect surface 2d may or may not abut the outer axial end surface of the end member 1b.

Figure 6:
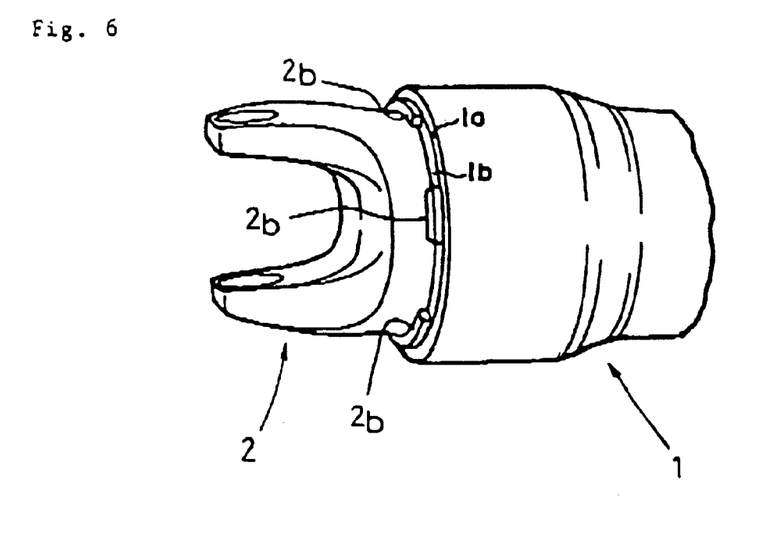
FIG. 6 is a schematic perspective view showing another example of a joint different from that shown in FIG. 2.
Figure 7:
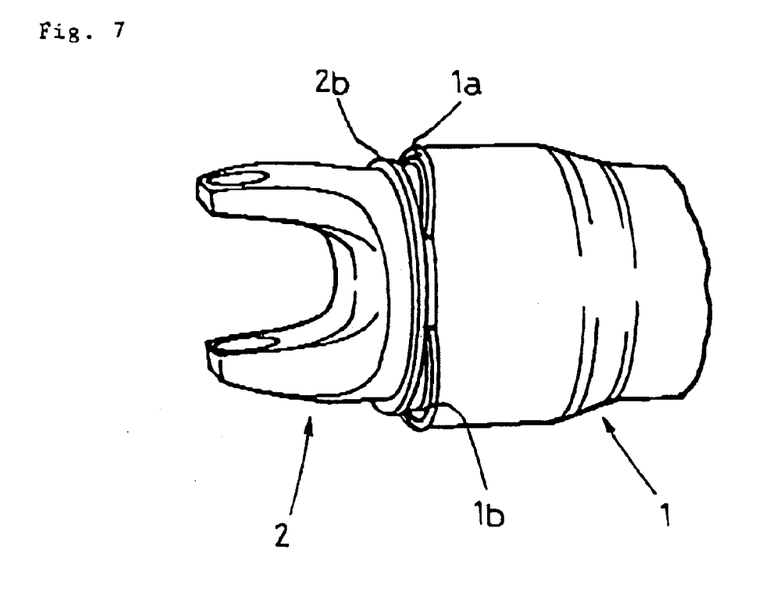
FIG. 7 is a schematic front view showing still another example of a joint different from that shown in FIG. 2.
Figure 8:
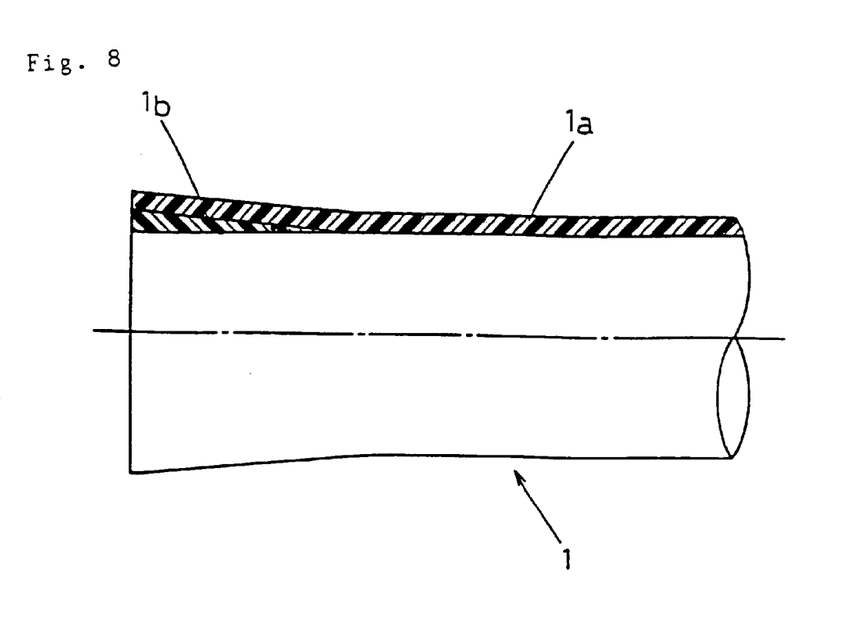
FIG. 8 is a schematic front view, partly in longitudinal section, of the essential part of a main body having a end member of a different configuration.

In the embodiment shown in FIGS. 4 and 5, it is also possible, as shown in FIG. 6, for the protrusion 2b to consist of a plurality of protrusions arranged circumferentially on the joint 2 to form a ring-like configuration as a whole. Furthermore, as shown in FIG. 7, it is also possible to partially bevel the outer end surface of the main body, opposed to the protrusion 2b. This localizes the stress that is applied to the end member 1b when the axial compressive load is applied to the joint 2 in the axial direction thereof. Furthermore, the shearing stress acting on the interface between the main layer 1a and the end member 1b is also localized, with the result that the inter-layer exfoliation or rupture is brought about and caused to proceed more reliably. Further, this leads to an increase in the degree of freedom with respect to the starting load for causing the exfoliation or rupture.

In the above-described embodiments, the main body is symmetrical about the midpoint with respect to the length direction thereof. However, this should not be construed restrictively. For, as will be described below, it is not always necessary for the rupture of the main body to proceed simultaneously from both ends thereof. Though it depends on the method of joining the joint, etc., it is possible to adopt a construction in which one of the ends has no end member.

Furthermore, the joints described above preferably have a serration in the joint section. Such a joint can be joined to the main body more firmly, which is advantageous from the viewpoint of the transmission of torsional torque. However, this should not be construed restrictively. Although it depends on the junction method, etc., it is also possible to use a joint having no serration.

Furthermore, although it is desirable for the joint to be joined by press fitting, it is also possible to adopt a junction method in which press fitting is combined with an adhesive.

In the above-described shock absorbing tubes, the joint that is joined to one end of the main body is the same as that joined to the other end thereof. That is, these shock absorbing tubes are symmetrical about the midpoint with respect to the length direction. Although this is advantageous in that the number of kinds of parts is relatively small such as collapsing tube or steering column in steering system, it is also possible to provide a joint having no compressive load transmitting section at the other end of the main body since it is not absolutely necessary for the rupture of the main body to proceed simultaneously from both ends thereof.

When considered from the viewpoint of the progress of rupture in the main body described above, it is desirable for the end member $1b$ to be formed such that its inner end portion, which is opposite to the outer end portion, has a wedge-shaped longitudinal-sectional configuration as shown in FIG. 1, etc. Furthermore, as shown in FIG. 1, it is also desirable for the thickness of the end member to be gradually diminished from the axially outer end surface toward the axially inner end surface thereof.

In the shock absorbing tube of the present invention, it is preferable to satisfy the following relation, $0.15Fm \leq Fs \leq 0.60Fm$, more preferably, $0.20Fm \leq Fs \leq 0.50Fm$.

When used as propeller shaft of automobile, preferably, said axial force is 8,000 to 15,000 kgf and the successive axial force of 5,500 to 1,000 kgf. More preferably, said axial force is 9,000 to 13,000 kgf and said successive axial force of 4,500 to 2,000 kgf. Still more preferably, said axial force is 10,000 to 12,000 kgf and said successive axial force of 4,000 to 2,500 kgf. However, in other uses, its inner and outer diameter and said axial force can be designed in wide range according to its purpose.

When used as a propeller shaft of automobile, it preferably has a torsional strength of 250 to 700 kgf.m. More preferably, it has a torsional strength of 300 to 500 kgf.m.

When used as collapsible handle member of automobile, preferably, said axial force is 200 to 1,500 kgf and the successive axial force of 400 to 100 kgf. More preferably, said axial force is 250 to 1,500 kgf and said successive axial force of 300 to 150 kgf. Still more preferably, said axial force is 300 to 1,100 kgf and said successive axial force of 250 to 100 kgf. However, in other uses, its inner and outer diameter and said axial force can be designed in wide range according to its purpose.

In this invention, the end member can also be made of a metal and it can be integrally made with a joint.

Figure 9:
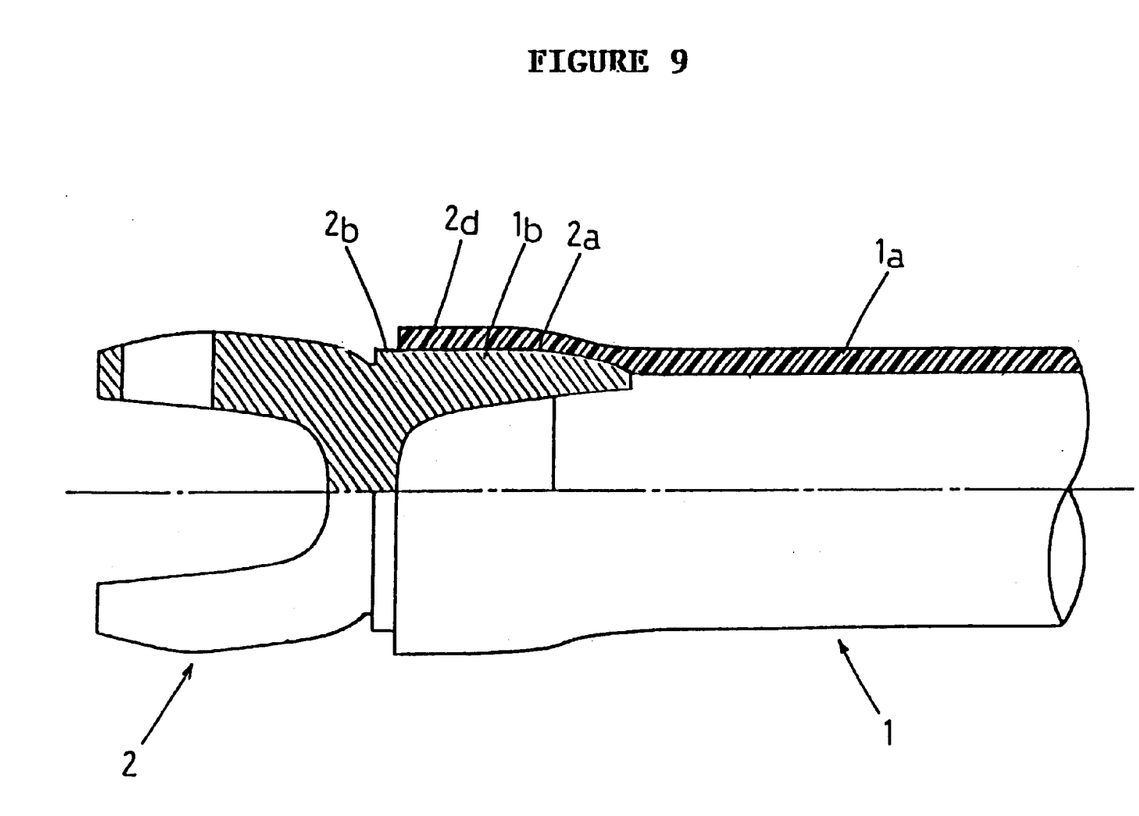
FIG. 9 is a schematic front view, partly in longitudinal section, showing the essential part of a shock absorbing tube of the present invention having an end member that is integrally made with a joint.

FIG. 9 shows a shock absorbing tube according to another embodiment of the present invention, in which an end member is integrally made with a joint.

Figure 10:
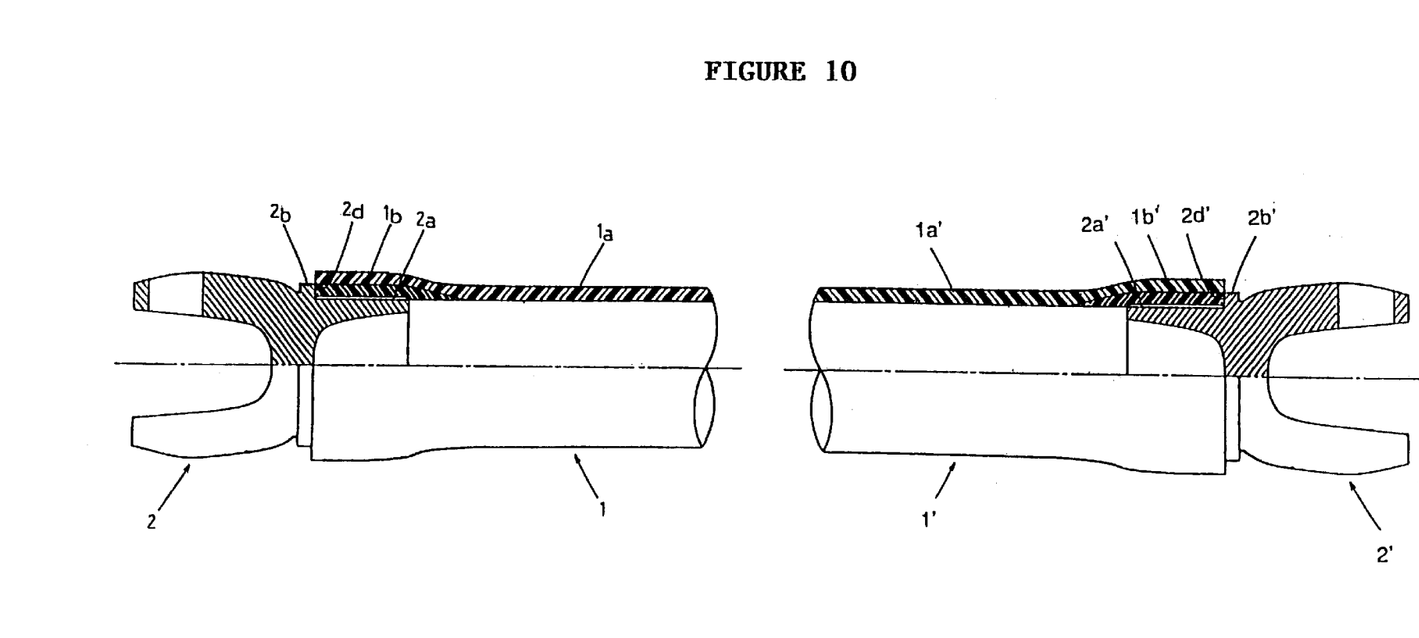
FIG. 10 is a schematic front view, partly in longitudinal section, showing the essential part of a shock absorbing tube of the present invention, further comprising a second end member formed integrally at another end of said main body.

FIG. 10 shows a shock absorbing tube of the present invention, further comprising a second end member formed integrally at another end of said main body.

EXAMPLE 1

The main body was formed by the filament winding method. That is, six bundles of carbon fibers (average single fiber diameter: 7 $\mu$m, number of single fibers: 12,000, tensile strength: 490 kgf/mm2, tensile modulus: 23,500 kgf/mm2) were properly arranged and impregnated with bisphenol-A-type epoxy resin containing curing agent and curing accelerator, and, in so doing, the bundles were wound on a mandrel having an outer diameter of 70 mm and a length of 1,300 mm. Firstly, ten layers were wound on one end section of a length of 100 mm so as to be at an angle of ±85° with respect to the axial direction to thereby form an end member having a thickness of 2.5 mm. After this, the procedure moved to the other end to form a similar end member on the other end section, and then six layers were wound over the entire length of the mandrel at an angle of ±15° with respect to the axial direction to thereby form a main body having a thickness of 2.5 mm. Further, one layer was hooped over the entire length of the mandrel at an angle of −80° with respect to the axial direction.

Next, epoxy resin was heated at a temperature of 150° C. for 6 hours to thereby cure the epoxy resin while rotating the mandrel. Then, the mandrel is drawn out, and each end portion of an extension of 50 mm was cut off and removed, whereby a main body 1 as shown in FIG. 1 was obtained, which had an end-portion outer diameter of 80 mm, a end member outer diameter of 75 mm, an inner diameter of 70 mm, and a length of 1,200 mm.

Next, a metal joint 2 as shown in FIG. 2, whose joint surface 2a had a serration, an outer diameter of 70.5 mm, and a length of 40 mm, whose protrusion 2b had an outer diameter of 80 mm, and whose slope 2c made an angle of 30° with respect to the axial dimension of the main body 1, was joined to each end of the above main body 1 by press fitting to thereby obtain a shock absorbing tube according to this invention as shown in FIG. 1. The requisite force for the press fitting was 7,000 kgf.

Subsequently, the shock absorbing tube was subjected to a torsion test. The torsional strength of the shock absorbing tube was found to be 350 kgf.m, and the critical revolution 11,000 rpm, both of which proved sufficient as a shock absorbing tube for automobiles.

When an axial compressive load was applied to the shock absorbing tube, the main body and the end member were separated from each other at 10,000 kgf to thereby start rupture of the main body. After the rupture, sequential rupture as shown in FIG. 3 took place at a load of 3,000 kgf.

EXAMPLE 2

A shock absorbing tube as shown in FIG. 4 was obtained in the same manner as in Example 1 except that a joint was used the protrusion 2b of which had an outer diameter of 75 mm, which was the same as that of the end member 1b.

In a torsion test, the shock absorbing tube was found to have a torsional strength of 350 kgf.m and a critical revolution of 11,000 rpm, both of which proved satisfactory for a shock absorbing tube for automobiles.

Next, when an axial compressive load was applied, the main body and the end member were separated from each other at 11,000 kgf, and the rupture of the main body started. After the rupture, sequential breakage proceeded at a load of 3,500 kgf as shown in FIG. 5.

EXAMPLE 3

A shock absorbing tubes for collapsible handle system as shown in FIG. 4 was obtained in the same manner as in Example 1 except the following changes.

Firstly, the number of bungles of the end member was changed to four bundles (numbers of single fibers in total:

48,000) and four layers of fibers were wound on one end section of a length of 40 mm so as to be at an angle of ±85° with respect to the axial direction to thereby form an end member having a thickness of 1.5 mm. After this, the procedure moved to the other end to form a similar end member on the other end section, and then two layers were wound over the entire length of the mandrel at an angle of ±22.5° with respect to the axial direction to thereby form a main body having a thickness of 1.0 mm. Further, one layer was hooped over the entire length of the mandrel at an angle of −85° with respect to the axial direction.

The shock absorbing tube had an end-portion outer diameter of 40 mm, a main body outer diameter of 37 mm, an inner diameter of 35 mm, and a length of 400 mm.

Next, a metal joint 2 which is similar to that of FIG. 4, was joined to each end of the above main body 1 by press fitting to thereby obtain a shock absorbing tube according to this invention as shown in FIG. 4.

When an axial compressive load was applied selectively to the end member of the shock absorbing tube, the main body and the end member were separated from each other at 1,100 kgf to thereby start rupture of the main body. After the rupture, sequential rupture as shown in FIG. 10 took place at a load of 200 kgf.

EXAMPLE 4

A similar shock absorbing tubes to that of Example 3 was obtained in the same manner as in Example 3 except changing the end member to that made of aluminum.

When an axial compressive load was applied selectively to the end member of the shock absorbing tube, the main body and the end member were separated from each other at 300 kgf to thereby start rupture of the main body. After the rupture, sequential rupture as shown in FIG. 10 took place at a load of 150 kgf.

energy absorbing effect due to the crushable body structure to be exerted to a sufficient degree.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A shock absorbing tube comprising (a) a cylindrical main body comprising fiber-reinforced plastic and (b) an end member at an end of said main body, said main body and said end member are capable of separating from each other at an interface therebetween upon the application of a predetermined maximum axial force (Fm) and said end member is capable of moving axially by enlarging said main body by the application of a predetermined axial force (Fs),

TABLE 1

| | | | Example | | | |
|---|---|---|---|---|---|---|
| | | | 1 | 2 | 3 | 4 |
| Main Body | Winding angle | | ±15° × 4 −80° × 1 | ±15° × 4 −80° × 1 | ±22.5° × 2 ±85° × 1 | ±22.5° × 2 ±85° × 1 |
| | Inner diameter | mm | 70 | 70 | 35 | 35 |
| | Length | mm | 1200 | 1200 | 400 | 400 |
| End member | Winding angle | | ±85° × 10 | ±85° × 10 | ±85° × 4 | Aluminum |
| | Inner diameter | mm | 70 | 70 | 35 | 35 |
| | Length | mm | 50 | 50 | 20 | 20 |
| Maximum axial force | | kgf | 10,000 | 11,000 | 1,100 | 300 |
| Successive axial force | | kgf | 3,000 | 3,500 | 200 | 150 |
| Torsional strength | | kgf.m | 350 | 350 | | |
| Critical revolution | | rpm | 11,000 | 11,000 | | |

The shock absorbing tube of this invention is equipped with a compressive load transmitting section which concentrates a compressive load acting in the axial direction of the joint on the interface between the main body and the end member to thereby separate the main body and the end member from each other. Thus, as shown with reference to the embodiments, it is possible, at the time of collision, to allow the rupture of the shock absorbing tube to proceed reliably with the rupture of the car body while satisfying the fundamental requirements for the car, such as the torsional strength and the critical revolution, thereby enabling the wherein said main body comprises reinforcing fibers helically wound at an angle of ±5–30° with respect to the axial direction of said main body and the end member comprises a metal or reinforcing fibers hoop wound at an angle of ±70–90° with respect to the axial direction of said main body, wherein the shock absorbing tube satisfies the following relation: 0.15Fm≦Fs≦0.60Fm.

2. A shock absorbing tube according to claim 1, wherein said main body comprises reinforcing fibers helically wound at an angle of ±10–20° with respect to the axial direction of said main body.

3. A shock absorbing tube according to claim 1, wherein the end member is made of a fiber reinforced plastic and comprises reinforcing fibers hoop wound at an angle of ±80~90° with respect to the axial direction of said end member.

4. A shock absorbing tube according to claim 1, wherein the end member is made of a metal.

5. A shock absorbing tube according to claim 1, wherein the end member is press fit to an end of the main body with a joint.

6. A shock absorbing tube according to claim 1, wherein the end member is integrally made with a joint that is capable of being joined to an end of the main body.

7. A shock absorbing tube according to claim 1, wherein said cylindrical main body and said end member are adhesively bonded.

8. A shock absorbing tube according to claim 1, which satisfies the following relation: $0.20 Fm \leq Fs \leq 0.50 Fm$.

9. A shock absorbing tube according to claim 1, wherein the shock absorbing tube is a propeller shaft and Fm is about 8,000 to about 15,000 kgf and Fs is about 5,500 to about 1,000 kgf.

10. A shock absorbing tube according to claim 9, wherein Fm is about 9,000 to about 13,000 kgf and Fs is about 4,500 to about 2,000 kgf.

11. A shock absorbing tube according to claim 9, wherein Fm is about 10,000 to about 12,000 kgf and Fs is about 4,000 to about 2,500 kgf.

12. A shock absorbing tube according to claim 9, said shock absorbing tube having a torsional strength of about 250 to about 700 kgf.m.

13. A shock absorbing tube according to claim 12, said shock absorbing tube having a torsional strength of about 300 to about 500 kgf.m.

14. A shock absorbing tube according to claim 1, wherein the shock absorbing tube is a member of a collapsible handle system and Fm is about 200 to about 1,500 kgf and Fs is about 400 to about 100 kgf.

15. A shock absorbing tube according to claim 14, wherein Fm is about 250 to about 1,300 kgf and Fs is about 300 to about 150 kgf.

16. A shock absorbing tube according to claim 14, wherein Fm is about 300 to about 1,100 kgf and Fs is about 250 to about 100 kgf.

17. A shock absorbing tube according to claim 1, further comprising a second end member formed internally at another end of said main body.

18. A shock absorbing tube according to claim 1, wherein a main layer of said main body of said shock absorbing tube has a uniform inner diameter, extending over the entire length thereof.

19. A shock absorbing tube according to claim 1, wherein said interface is tapered.

\* \* \* \* \*